US011644901B2

(12) United States Patent
Ette et al.

(10) Patent No.: US 11,644,901 B2
(45) Date of Patent: May 9, 2023

(54) METHOD AND DEVICE FOR DETECTING A USER INPUT ON THE BASIS OF A GESTURE

(71) Applicant: VOLKSWAGEN AKTIENGESELLSCHAFT, Wolfsburg (DE)

(72) Inventors: Bernd Ette, Wolfsburg (DE); Volker Wintsche, Dresden (DE); Christian Gaida, Freital (DE)

(73) Assignee: Volkswagen Aktiengesellschaft

( * ) Notice: Subject to any disclaimer, the term of this patent is extended or adjusted under 35 U.S.C. 154(b) by 64 days.

(21) Appl. No.: 16/625,194

(22) PCT Filed: Jun. 18, 2018

(86) PCT No.: PCT/EP2018/066138
§ 371 (c)(1),
(2) Date: Dec. 20, 2019

(87) PCT Pub. No.: WO2018/234250
PCT Pub. Date: Dec. 27, 2018

(65) Prior Publication Data
US 2020/0143154 A1     May 7, 2020

(30) Foreign Application Priority Data
Jun. 20, 2017  (DE) ..................... 10 2017 210 316.7

(51) Int. Cl.
*G06V 40/20*     (2022.01)
*G06F 3/01*      (2006.01)
(Continued)

(52) U.S. Cl.
CPC ................ *G06F 3/017* (2013.01); *G06T 7/11* (2017.01); *G06T 7/13* (2017.01); *G06T 7/246* (2017.01);
(Continued)

(58) Field of Classification Search
CPC .... G06K 9/00355; G06K 9/6202; G06T 7/11; G06T 7/246; G06T 7/73; G06T 7/13;
(Continued)

(56) References Cited

U.S. PATENT DOCUMENTS 6,128,003 A    10/2000  Smith et al.
7,574,037 B2    8/2009  Hidai et al.
(Continued)

FOREIGN PATENT DOCUMENTS

DE    4438643 A1    5/1996
DE   19802261 A1    7/1999
(Continued)

OTHER PUBLICATIONS

Panwar, Meenakshi. "Hand gesture recognition based on shape parameters." 2012 International Conference on Computing, Communication and Applications. IEEE, 2012. https://ieeexplore.ieee.org/abstract/document/6179213 (Year: 2012).*
(Continued)

*Primary Examiner* — Claire X Wang
*Assistant Examiner* — Han Hoang
(74) *Attorney, Agent, or Firm* — Barnes & Thornburg, LLP

(57) ABSTRACT

A method for detecting a user input based on a gesture in which image data of at least two individual images are acquired and recoding times are allocated to the individual images. Each of the acquired individual images is segmented, an individual image object is identified in each of the individual images and a reference point is determined based on the individual image object. A trajectory is determined based on the reference points in the individual images and a gesture is determined based on the trajectory. An output signal is generated and output based on the gesture determined. A device for detecting a user input based on a
(Continued)

gesture having an acquisition unit for acquiring image data, a segmentation unit for performing segmentation, a trajectory computing unit for determining the trajectory, an allocation unit for determining a gesture and an output unit.

26 Claims, 5 Drawing Sheets

(51) Int. Cl.
  *G06T 7/11*    (2017.01)
  *G06T 7/246*   (2017.01)
  *G06T 7/73*    (2017.01)
  *G06T 7/13*    (2017.01)
  *G06T 7/60*    (2017.01)

(52) U.S. Cl.
  CPC .................. *G06T 7/60* (2013.01); *G06T 7/73* (2017.01); *G06V 40/28* (2022.01); *G06T 2207/20081* (2013.01); *G06T 2207/30196* (2013.01); *G06T 2207/30241* (2013.01)

(58) Field of Classification Search
  CPC ............. G06T 7/60; G06T 2207/20081; G06T 2207/30196; G06T 2207/30241; G06F 3/017
  See application file for complete search history.

(56) References Cited

U.S. PATENT DOCUMENTS

| | | |
|---|---|---|
| 8,854,433 B1 | 10/2014 | Rafii |
| 8,971,637 B1* | 3/2015 | Rivard .................... G06T 7/13 |
| | | 382/199 |
| 9,483,707 B2 | 11/2016 | Chen |
| 2002/0118880 A1* | 8/2002 | Liu .................... G06K 9/00335 |
| | | 382/199 |
| 2011/0221974 A1 | 9/2011 | Stern et al. |
| 2012/0068917 A1 | 3/2012 | Huang et al. |
| 2014/0168061 A1 | 6/2014 | Kim |
| 2017/0336874 A1 | 11/2017 | Chun et al. |

FOREIGN PATENT DOCUMENTS

| | | |
|---|---|---|
| DE | 602004004048 T2 | 7/2007 |
| DE | 102015103022 A1 | 8/2016 |
| WO | 2012088702 A1 | 7/2012 |
| WO | 2013085525 A1 | 6/2013 |

OTHER PUBLICATIONS

Search Report for International Patent Application No. PCT/EP2018/066138; dated Aug. 16, 2018.

International Preliminary Report on Patentability for International Patent Application No. PCT/EP2018/066138; dated Jan. 2, 2020.

* cited by examiner

METHOD AND DEVICE FOR DETECTING A USER INPUT ON THE BASIS OF A GESTURE

PRIORITY CLAIM

This patent application is a U.S. National Phase of International Patent Application No. PCT/EP2018/066138, filed 18 Jun. 2018, which claims priority to German Patent Application No. 10 2017 210 316.7, filed 20 Jun. 2017, the disclosures of which are incorporated herein by reference in their entireties.

SUMMARY

Illustrative embodiments relate to a method and an apparatus for capturing a user input on the basis of a gesture.

BRIEF DESCRIPTION OF THE DRAWINGS

Disclosed embodiments will now be explained with reference to the drawings.

DETAILED DESCRIPTION

Figure 1:
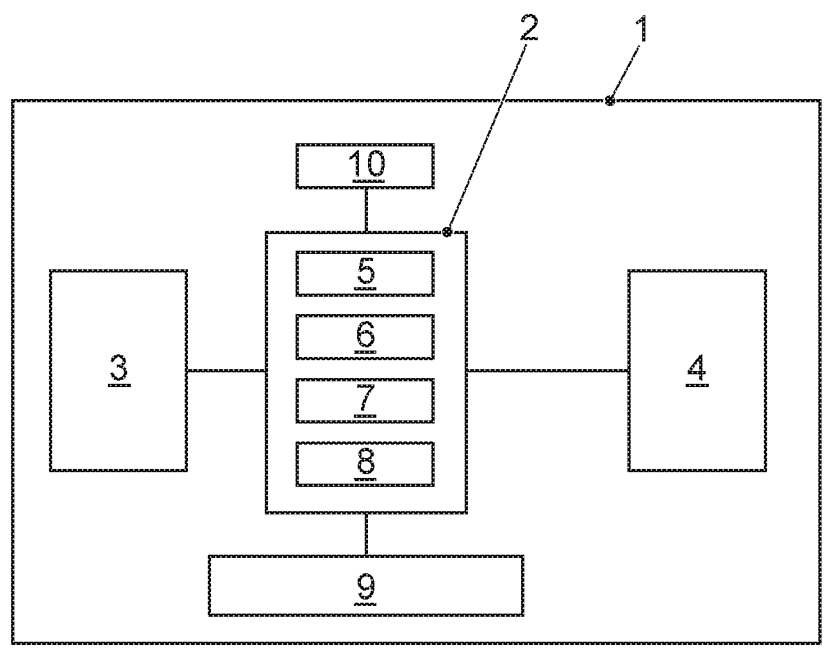
FIG. 1 shows a transportation vehicle with an exemplary embodiment of the disclosed apparatus.

The multiplicity of electronic devices used in many areas of private and professional life make it an urgent task to develop technologies for simple use thereof. One approach to this is use by gesture control, that is continuing to present challenges to provide an input option usable with everyday convenience.

The method for object detection by ultrasound that is described in DE 44 38 643 A1 involves workpieces being located and detected. This is accomplished by determining different reflection profiles, comparison of which permits statements about the geometry of the object surface. The trend in the profiles further exhibits features that are used for classifying and detecting the workpieces.

DE 198 02 261 A1 proposes a method for signal processing for time series of digitized images that involves objects being detected and the motion thereof being analyzed. This is accomplished by using time-delayed neural networks.

The method for detecting a known object in a field of vision of a three-dimensional machine vision system that is described in DE 10 2015 103 022 A1 provides for an image file to be used to determine features in two operations, the operations involving the relevant search space for the comparison against known objects being decreased and the search being simplified in this manner. Histograms are used to extract a distribution of colors and edge directions from the image file; further, shape functions are ascertained.

The method for object detection described in DE 60 2004 004 048 T2 involves an image being scanned, with the size of a window used for the scanning being varied to detect objects of different sizes. In deciding whether an object is detected, the window sizes are used to calculate and compare multiple estimates.

The method for providing a mechanism for gesture recognition that is described in WO 2012/088702 A1 involves a series of images being divided into blocks, and a motion status is determined for the blocks. To ascertain the direction of movement of an object, the movement of edges is considered in a histogram generated on the basis of the motion status of the blocks.

WO 2013/085525 A1 proposes techniques for gesture detection that involve the number of pixels to be analyzed in captured images being decreased by a stereo capture. This is accomplished by determining, for example, an image region in which a movement of an object is supposed to be detected.

However, a limiting factor for the known methods is frequently that reliable detection of a captured gesture requires considerable computation power to be expended that is often not available, in particular, in mobile devices, for example, in the field of transportation vehicle engineering.

The disclosed embodiments provide a method and an apparatus of the type cited at the outset that allow fast, reliable and less computationally intensive detection of gestures. The disclosed embodiments allow complex gestures and movements to be evaluated in a manner that conserves resources.

This is achieved by a method and an apparatus.

The disclosed method for capturing a user input on the basis of a gesture involves image data having at least two frames being captured, wherein the frames have associated recording times. The captured frames are each used to perform a segmentation, wherein a respective frame object is determined for each individual image and the frame object is used to determine a reference point. The reference points of the frames are used to determine a trajectory and the trajectory is used to determine a gesture. The determined gesture is used to generate and output an output signal.

A "gesture" is understood within the context of the disclosure to mean a specific position of an input object, for example, a hand or another body part of a user, or a specific movement carried out with the input object. The gesture comprises a combination of static and dynamic elements, for example, a change in the position of the input object during a movement. This involves the position and/or orientation of the input object in space being taken into consideration. Further, there may be provision for the input object to have multiple elements, for example, the fingers of a hand, that are movable independently of one another to a certain extent, so that in addition to the position and/or movement of the input object it is also possible for the position and orientation of the elements of the input object to be taken into consideration. The input object can further comprise an item that can be carried by a hand of a user and positioned in space, for example, such as a pen or another body, for example.

The gestures may be configured in a manner known per se. They comprise pointing gestures, swiping gestures and gestures used in everyday custom, for example, hand rotations, gripping, swiping, sliding or dragging gestures and combinations of several such gestures, possibly carried out in immediate quick succession. Gesture control therefore provides the user with a particularly simple and intuitive input option.

The gestures are carried out in a capture space without the user having to approach or make contact with a specific tangible object in the process. In further exemplary embodiments, there is provision for the gesture to comprise contact with a tangible object, the gesture being captured completely during the contact, for example, along a touch-sensitive surface.

The gesture can further be assigned directional information, which is determined on the basis of direction of a movement or an orientation of the gesture. Such a gesture may be formed analogously to the use of an analog control element, for example, analogously to sliding or rotating a control element, but with no actual displacement or rotation of a physical control element taking place, but rather such a pattern of movement merely being followed as a result of the movement of the input object in the capture space. Such gestures are typically able to be noticed particularly easily by the user. Such a method moreover affords the benefit that the user does not have to touch a specific surface region—as in the case of a switch or rotary knob, for example. Rather, it suffices for him to move the input object, for example, his hand, into the capture space and to carry out the applicable gesture therein. Alternatively or additionally, the gesture may have one direction distinguished by a static geometric parameter, for example, by virtue of the input object taking on a specific shape that defines an axis or direction.

The gesture may further be divided into multiple phases, wherein there may be provision for at least one phase to be captured contactlessly in the capture space. The phases may be in a form such that use is implemented with multiple operations. By way of example, the gesture can comprise a first phase, which is interpreted as selection of a function, and at least one further phase, in which an adjustment is made by the selected function.

The method initially involves image data being captured, for example, by a camera system. The image data comprise at least two frames that each have an associated recording time. The frames can be captured in succession in chronological order, with a longer series of frames being captured at regular intervals of time. The image data are captured as video data in a manner known per se. The capture space is defined as the physical region in which image data are capturable by the camera system, or as a physical region to which the capture and/or evaluation of the captured image data is restricted.

The image data comprise spatially resolved information, in particular, about a multiplicity of picture elements that are arranged in a matrix. This information can be of different type, for example, the intensity or another feature of a detected electromagnetic radiation or information obtained by ultrasound. The image data can further be captured for the picture elements simultaneously or in succession, for example, by an image sensor having a multiplicity of picture elements or by a scanner for capturing the picture elements in succession. A time is associated with a frame in a manner known per se in this case, an image produced by a scan process also being able to be assigned an individual time, even though the individual picture elements were not captured completely simultaneously, but rather in succession.

Further, there may be provision for a gesture capture device formed in another manner, for example, with a resistive and/or capacitive surface by which at least a first phase of a gesture can be captured. In this case too, spatially resolved data can be captured and evaluated as image data within the context of the disclosure.

When capturing the image data, it is further possible for signal conditioning known per se to be performed, for example, improvement of the image quality, smoothing, filtering, calibration or other measures. Further, image information can be read in that relates, for example, to a time assigned to a frame, or information about a user who carries out the gesture.

The captured image data are used to perform a segmentation for each of the captured frames, the segmentation involving a frame object being determined. "Segmentation" is understood according to the disclosure to mean the determination of associated image regions. This involves taking into consideration image data that are associated with the same time, that is to say with the data of a specific frame. The frame comprises picture elements (pixels) arranged as a matrix, for example. The segmentation then involves associated picture elements being determined in a manner known per se, the picture elements forming a coherent region within the frame and being considered as a frame object. By way of example, a frame element detected during the segmentation represents a depiction of an input object in a frame at the associated recording time. That is to say that the frame objects of successive frames may be depictions of the same input object that are captured at successive times.

The segmentation can further involve regions being determined that are not supposed to be captured as frame objects, that is to say regions within the image data that are not associable with an input object and that make no contribution to the detection of a gesture. These are, for example, different objects than the input object itself. Picture elements associated with such regions can be filtered out, in particular, by a multistage method. This is effected in a manner known per se, for example, on the basis of upper and/or lower threshold values for the surface or other features of the frame object. Further, it is possible for further elements of the image data to be filtered out, for example, the wrist and the arm in the case of a gesture carried out by a hand, with simple image detection being able to be performed.

In a further operation, the frame object is used to determine a reference point. This can be effected in a manner known per se, with the surface taken up by the frame object and/or the shape of the outline being taken into consideration.

In at least one exemplary embodiment of the disclosed method, the reference point is the geometric centroid of the frame object, in particular, the geometric surface centroid of the frame object. This makes it easier to reproducibly determine the reference point.

By way of example, the surface centroid $\vec{s}$ of a frame object having m picture elements that are equally weighted and each have an associated vector $\vec{x}_l$ can be calculated according to the following formula:

$$\vec{s} = \frac{1}{m} \sum_{l=1}^{m} \vec{x}_l$$

Here, the vector $\vec{x}_l$ indicates in particular, a position of the picture element within a two-dimensional grid of a frame. As explained in more detail below, a generalization can be made for higher-dimensional, in particular, three-dimensional, vectors.

The reference points determined for the frames are used to determine a change in the position of the reference point on the basis of time. This is parameterized as a trajectory, that is to say that the position of the reference point is represented as a time-dependent variable.

In one development, a continuity test is used to detect associated frame objects of successive frames, and the trajectory is determined on the basis of the associated frame objects. This makes it possible to ensure that the trajectory relates to associated frame objects, in particular, multiple depictions of the same input object, and the measurement data are not corrupted by virtue of, for example, the movements of different input objects being incorrectly interpreted as the trajectory of a single input object.

The continuity test can take place in different ways, for example, by determining how far the reference point for a frame object has moved between two successive frames, with sharp movements being able to be rejected as implausible. Further, changes in the surface area that potentially associated frame objects take up in successive frames can be examined for their plausibility, so that, for example, a sudden or discontinuous increase or decrease in the surface area can be interpreted as misdetection. Analogously, changes on the basis of the shape of the frame objects of successive frames can be checked for plausibility in this manner, for example, to exclude frame objects whose shape changes in an improbable manner.

By way of example, the continuity test can involve a threshold value being stipulated that defines a maximum speed along the trajectory, and if this speed is exceeded between two successive frames, the trajectory can be interrupted at a point determined in this manner. Alternatively or additionally, there may be provision for further threshold values or other methods for continuity testing.

Determination of the gesture on the basis of the trajectory can take place in different ways and can take into consideration different parameters of the trajectory, that is to say, for example, a speed and/or direction of the sequence of movement, and also time derivatives for such parameters, for example, accelerations and/or changes of direction. The movement of the reference points of the individual frames can furthermore be processed by a filter that filters out very slight movements, for example, and can treat the frame objects as static objects.

By way of example, the gesture can comprise a swiping, scrolling or slide gesture from one page to another page. The gesture can further describe a path of movement along which a movement of an operable object, for example, on a graphical user interface, is produced.

The method involves the determined gesture being used to generate and output an output signal. The output signal can comprise control data for a device, to which the output signal is transmitted on output. The output in this case does not necessarily need to be effected such that information registerable by a human being is output, but rather can merely be effected to a device. Alternatively or additionally, an output perceptible to human beings can be effected, for example, by virtue of the output signal being taken as a basis for producing and outputting a visually, optically and/or audibly perceptible output, the output being effected by an output unit.

In a further development, orientations are determined for the frame objects, and the gesture is further determined on the basis of the orientations of the frame objects. The orientations are determined as parameters on the basis of time and taken into consideration to determine the gesture. This allows complex gestures to be captured, for example, comprising a rotation of the input object.

Available information about the orientations can alternatively or additionally be used to make a correction to the data, for example, to detect gestures without possible perturbations as a result of different orientations of the frame objects. This allows a rotation of the frame object to be corrected and the detection of a gesture regardless of a specific orientation to be made easier. This is accomplished by virtue of angles of inclination being determined for the frame objects on the basis of the orientations, and the angles of inclination can be used to perform an equalizing transformation for the frame objects of the frames. This allows gestures to be captured regardless of the angle of inclination. If the input object is a hand of a user, for example, the angle of inclination can be determined on the basis of the position of a wrist relative to the other regions of the detected frame object.

In one development, the image data comprise picture elements and the picture elements have associated distance information. This allows the input object to be detected particularly reliably within the image data, and additional information can be used to detect gestures in particularly differentiated states.

There may be provision for the image data to be captured by a time-of-flight camera (ToF camera). This involves a light pulse, typically in the infrared range, being transmitted and the light reflected by objects within a capture space is detected. The light source and the detector are typically arranged close together. A time offset between the sending and receiving of the light pulse and, from that, the distance of the object relative to the camera are determined. In this manner, distance information can be captured for each picture element.

This further permits filtering of the captured image data on the basis of the distance information, for example, to take into consideration only image data within a particular range and to reject a detected background, for example. This allows the capture space in which the gesture is captured to be accurately prescribed, the capture space being determined dynamically, in particular, for example, after the distance of the input object from the sensor has been estimated in a first operation. Picture elements with distance information indicating a reflection by an object outside the defined capture space can be filtered out in this manner. In comparison with other systems, it is moreover also possible for objects having low reflectivity to be reliably detected, since the sensitivity of typical ToF systems is sufficient to detect a weak reflection.

In further exemplary embodiments, the image data with distance information can be captured by other methods, for example, by ultrasound or a stereo camera.

Further, the reference points for the frame objects can also be determined on the basis of the distance information. This allows, for example, three-dimensional positions of the reference points to be determined, namely on the basis of the position data within a two dimensional frame and the associated distance information. By way of example, the formula explained above for calculating the surface centroid can be used, the vectors associated with the picture elements each representing three-dimensional positions. This permits the reference points of multiple chronologically successive frames to be used to determine a three-dimensional trajectory of an input object relative to a sensor. In this manner, slide and drag gestures toward and away from the sensor can be captured, for example.

In one development, a respective outline of the frame object is determined for each frame, and a respective interval from the reference point of the frame object is determined for a multiplicity of points on the outline of the frame object. In this case, a measured interval profile is produced for each frame object on the basis of the intervals, and the gesture is further determined on the basis of the measured interval profile. This permits particularly simple parameterization of the frame objects and reproducible detection of the gesture.

The outline of a frame object can be determined in a manner known per se, with the shape of the outermost picture elements being determined. The gesture is detected in this case on the basis of a measured interval profile, which can be characterized on the basis of particularly simple features. This results in the method being able to be carried out in a particularly fast and resource-conserving manner even with little computation power. Moreover, image data having a particularly low resolution can be used for gesture detection.

Starting from the reference point, an interval profile is produced that comprises the interval of the outline of the frame object from the reference point. This can be accomplished, for example, by virtue of a pointer being defined that extends from the reference point to a point on the outline, and the length of the pointer can be determined. To produce the interval profile, this pointer can be produced and measured for a multiplicity of points along the outline, the interval profile comprising a parameterization of the outline in polar coordinates starting from the reference point, that is to say that the interval profile indicates the distance of a point on the outline from the reference point on the basis of an angle of the pointer. The interval profile is produced such that the angle of the pointer is defined in a specific manner, for example, by virtue of a pointer that points perpendicularly upward being at an angle of 0°, whereas a pointer that points perpendicularly downward is at an angle of 180°. To determine the interval profile, the angle of the pointer can sweep through the angles from 0° to 360° clockwise, for example.

In further disclosed embodiments, there may be provision for different production of the interval profile, in particular, by a different kind of parameterization of the outline of the frame object. For example, the points on the outline may be arranged equidistantly along the outline.

Further, there may be provision for smoothing and/or filtering of the data of the interval profile to be performed, for example, by a moving average or a different filtering to reject high-frequency fluctuations and/or noise.

In at least one disclosed embodiment, a surface area is determined for each of the frame objects and the applicable measured interval profile is normalized on the basis of the determined surface area. This allows gestures to be detected independently of the actual size of the frame object, for example, independently of the size of a hand used to perform the gesture.

For the purposes of the normalization, it is possible for a surface area circle to be determined, for example, the center of which coincides with the reference point and the radius r of which is determined such that the surface area Acircle of the surface area circle is concordant with the surface area Aobj of the frame object in the frame:

$$A_{circle} = \pi * r^2 = A_{obj}; r = \sqrt{\frac{A_{obj}}{\pi}}$$

The interval of a point on the outline of the frame object from the reference point can in this case be indicated relative to the radius r, for example, by multiplication by the normalization factor $$\frac{1}{r}.$$

In this case, values above 1 indicate that the outline at a position is further away from the reference point than the radius of the surface area circle, whereas, conversely, values below 1 indicate that the outline runs inside the surface area circle.

The normalization is carried out separately all frame objects, so that the further analysis of the captured gestures is effected on the basis of numerical data. The normalization factor determined in this manner can further be taken into consideration for determining the gesture. By way of example, this can be accomplished by taking into consideration a change in the size of the frame object as a function of time.

The gesture can be determined on the basis of a single measured interval profile or on the basis of a sequence of different interval profiles, in particular, for multiple frame objects, in different ways. That is to say that a gesture may be made up of multiple partial gestures, or a specific sequence of partial gestures can be interpreted as a single gesture.

In a further development, geometric profile features of the measured interval profiles are determined and the gesture is determined on the basis of the geometric profile features. This permits particularly simple, geometric extraction of fundamental features of the interval profile.

Geometric profile features can be, for example, the number and placement of extreme values and/or points of inflection of the interval profiles. Profile features are determined in the style of a curve discussion, known per se, in which characteristic features of a mathematical curve are determined. Alternatively or additionally, analogously, the data about the trajectory are processed, for example, by analyzing the trajectory by curve discussion.

The determined geometric profile features can be associated with a gesture in different ways. By way of example, in at least one disclosed embodiment, there may be provision for the number of maxima of the interval profile to be associated with a gesture, for example, if a gesture is characterized by a specific number of extended fingers and the number of maxima corresponds to this very number. Alternatively or additionally, by way of example, intervals between two extremes can be used for associating a gesture, for example, to detect whether two fingers arranged next to one another on one hand are extended, or the derivative of the interval profile can be used to determine further characteristic profile features. Since these profile features are available for the multiplicity of frames of the image sequence, it is also possible to take into consideration changes in the profile features and the speed of these changes for determining the gesture.

In one development, the gesture is determined on the basis of a profile comparison in which the measured interval profiles are compared with a multiplicity of reference interval profiles, wherein the reference interval profiles each have an associated gesture. This allows specific gestures to be prescribed for the detection, and also complex gestures to be detected.

The reference interval profiles can be prescribed by a manufacturer on delivery of an apparatus for carrying out the disclosed method, for example, or can be provided at a later time. Alternatively or additionally, there may be provision for input options, for example, to capture and store new reference interval profiles for a user, for example, to learn a new gesture or to improve the detection of an already known gesture.

Alternatively or additionally, the determined trajectory can be compared with reference trajectories, and the gesture can be determined analogously to the methods described for reference interval profiles.

In one development, geometric reference features are determined for the reference interval profiles, and the profile comparison is performed on the basis of the reference features and the profile features of the measured interval profiles. This allows the complexity of the profile comparison to be reduced further.

The reference interval profiles can be provided in different ways. By way of example, the measured interval profile can have a specific resolution, that is to say a specific number of points on the interval profile. The reference interval profiles can be provided using the same or a different resolution; alternatively or additionally, they can comprise reference features that are determined in the style of the profile features described above that are determined for the measured interval profiles. As a result of the reference features being provided directly, the profile comparison does not require new analysis of the reference interval profiles to take place.

The profile comparison can accordingly be effected such that the provided data of the reference interval profiles and the measured interval profiles can be used particularly efficiently and without unnecessarily great computational involvement.

In a further development, at least two extreme values of the measured interval profiles are determined, and the profile comparison is effected on the basis of the determined extreme values of the measured interval profiles. As a result, the profile comparison can be effected particularly easily and with correspondingly low computation power.

By way of example, the profile comparison can involve the number, placement and/or amplitude of the extreme values being taken into consideration. These parameters are particularly easily determinable and characterize the measured interval profile and also the reference interval profiles. The profile comparison can therefore be performed particularly easily. The data required for the profile comparison, for example, about the extreme values, may already have been preprocessed and stored for the reference interval profiles, so that no fresh analysis of the reference interval profiles is necessary.

Analogously, the trajectory can be processed and associated by analyzing extreme values of the position profile, speed trend or acceleration of a gesture.

In one development, a first derivative of the interval profiles is determined, and the profile comparison is effected on the basis of the determined derivative. In this case, a second derivative can furthermore be determined. This allows additional relevant parameters of the interval profile to be ascertained and the association with the reference profile to be made easier. Geometric profile features can be determined on the basis of the first and/or second derivative, for example, the number and placement of extreme values and/or points of inflection of the interval profile. Analogously, an analysis of the trajectory can be performed by a comparison with reference trajectories.

In one development, the profile comparison is performed on the basis of a machine learning method, for example, on the basis of a neural network. This allows the comparison to be performed particularly accurately. The classification and detection of a gesture on the basis of the trajectory, the interval profile and the profile comparison can be improved by training data.

Further, there may be provision for the determined interval profiles and/or the trajectory to be used to learn a new gesture. This can be effected in different ways known per se, for example, by virtue of the interval profiles of the captured image data or a multiplicity of image data captured separately from one another being used to produce a new reference profile that is associated with a specific gesture and permits or improves detection thereof. Analogously, a new reference trajectory can be produced. Further, a machine learning method can be used, for example, to learn a new gesture by a neural network.

In at least one exemplary embodiment of the disclosed method, the captured image data comprise an at least partial depiction of a hand. The gesture is determined on the basis of a number of extended fingers on the hand. This allows the gesture to be carried out by the hand of the user, so that an additional input object does not need to be used. The gesture is furthermore particularly easily performable by the user. As an alternative or in addition to taking into consideration the number of extended fingers, there may be provision for gestures in which a specific finger, for example, the index finger, or multiple fingers in combination are extended, for example, the thumb and index finger at the same time or the index and middle fingers of one hand. In further exemplary embodiments, other input objects can be used instead of a hand and the fingers thereof.

In one development, the gesture comprises a movement of the hand, for example, a change in the position of the entire hand or of individual fingers, stretching or bending of fingers, a rotation and/or a change of position of the hand or of individual fingers. The position of individual fingers relative to one another and relative to the hand can be taken into consideration in this case. In this manner, it is possible for a zoom, a displacement, a marking and/or a selection, for example, to be implemented by a gesture. Furthermore, multiple gestures carried out in succession can be detected by the captured image sequence.

In one development, the determination of the gesture involves testing whether at least one frame object of the frames is detected as a hand. This makes it possible to ensure that a gesture performed with the hand is captured, so that misdetections can be avoided.

Over the course of the trajectory, the frame objects are analyzed and can be tested for features of a hand. By way of example, the shape of a frame object can be determined and a check can be performed to determine whether fingers are detectable, for example. This is not the case if a specific part of the arm is detected, for example. If the hand is not detectable over the entire course of the trajectory, then the detection of a gesture can be made dependent on whether the hand was detected at a specific time and/or at a position within the trajectory.

In a further development, the gesture comprises a rotation of a hand. Such gestures are particularly easily performable and can be used without tools.

When capturing the gesture, the captured image data can for example, substantially comprise a depiction of the palm or the back of the hand, possibly with fingers of the hand. Moreover, there may be provision for a side view of the hand to be detected, for example, following a rotation of the hand such that an edge of the hand is directed toward the sensor. By way of example, such a position of the hand can be detected on the basis of an elongate frame object. Further, a change in the position of the hand can be detected by virtue of a change being identified on the basis of at least one property of the detected frame object, for example, an eccentricity, a roundness, an amplitude or repetitions within an interval profile.

The disclosed apparatus of the type cited at the outset comprises a capture unit by which image data having at least two frames are capturable, wherein the frames have associable recording times. It further comprises a segmentation unit by which the captured frames are each usable to perform a segmentation, wherein a respective frame object is determinable for each frame and the frame object is usable to determine a reference point. It moreover comprises a trajectory calculation unit by which the reference points of the frames are usable to determine a trajectory, and also an association unit by which the trajectory is usable to determine a gesture, and an output unit by which the determined gesture is usable to generate and output an output signal.

The disclosed apparatus is designed to implement the method described above. The disclosed apparatus therefore has the same benefits as the disclosed method.

The output unit comprises an interface by which the output signal is transmittable to another device, an output perceptible to human users not necessarily being produced. The output can be transmitted to a further device in a manner known per se, for example, so that gesture control is implemented for this device.

In at least one exemplary embodiment of the disclosed apparatus, a respective outline of the frame object is determinable for each frame, and a respective interval from the reference point of the frame object is determinable for a multiplicity of points on the outline of the frame object by a profile calculation unit, with the measured interval profile being producible for each frame object on the basis of the intervals. In this case, the gesture is determinable on the basis of the measured interval profile.

The apparatus is arranged in a transportation vehicle and/or included by the transportation vehicle.

Referring to FIG. 1, a transportation vehicle with an exemplary embodiment of the disclosed apparatus is explained.

A transportation vehicle 1 comprises a capture unit 4 coupled to a control unit 2. It further comprises a device 3, in the exemplary embodiment shown a radio 3, and a memory unit 9, which are both likewise coupled to the control unit 2. In this case, the control unit 2 comprises a segmentation unit 5, a profile calculation unit 6, an association unit 7 and an output unit 8. The control unit 2 further has a trajectory calculation unit 10 coupled to it.

In the exemplary embodiment, the capture unit 4 comprises a time-of-flight camera 4, designed in a manner known per se. Light pulses in the infrared range are transmitted and reflected from objects. Such light reflected by objects in a capture region is detected, and the time offset that occurs between the transmitting of the light pulse and the detection of the reflected light is determined for a matrix of picture elements of the time-of-flight camera 4. The time offset and the speed of light are used to calculate the path of travel of the light and the distance of the reflecting object. The data produced on detection can be used to produce image data, wherein each picture element has associated distance information, for example, a value for the distance of a reflecting object. Further, data about a detected intensity, a scatter or other parameters can be captured.

In further exemplary embodiments, the capture unit 4 can alternatively or additionally comprise other sensors or detector types, for example, a stereo camera, an ultrasonic system, a laser scanner or another unit with similar operation, which allow the determination of distance information for the image data, in particular. Further, there may be provision for a capture unit 4 that involves the image data being determined without distance information, for example, using a simple camera.

In the exemplary embodiment, there is further provision for the capture unit 4 to capture a series of frames. The captured image data in this case comprise video data. In another exemplary embodiment, however, there may also be provision for a chronological series of frames to be captured in another way.

Figure 2A:
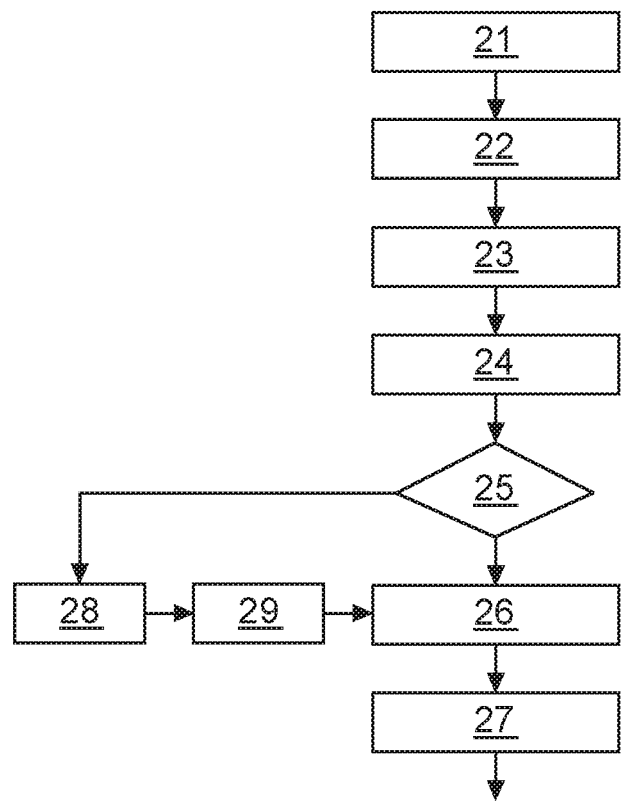
FIGS. 2A to 2C show an exemplary embodiment of the disclosed method.
Figure 2B:
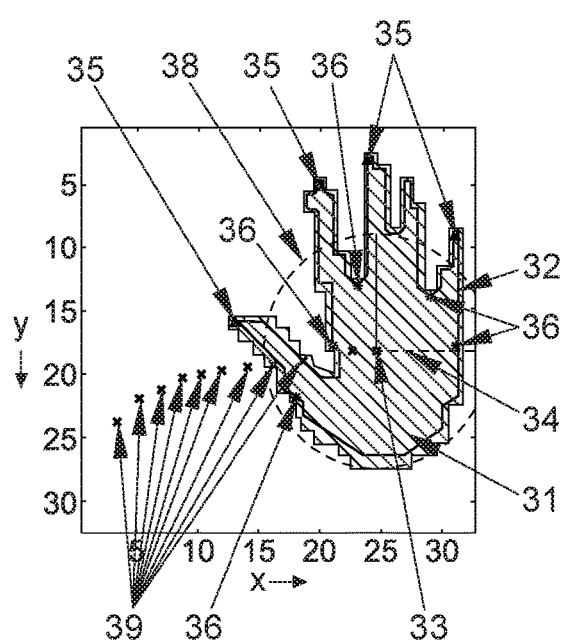
Figure 2C:
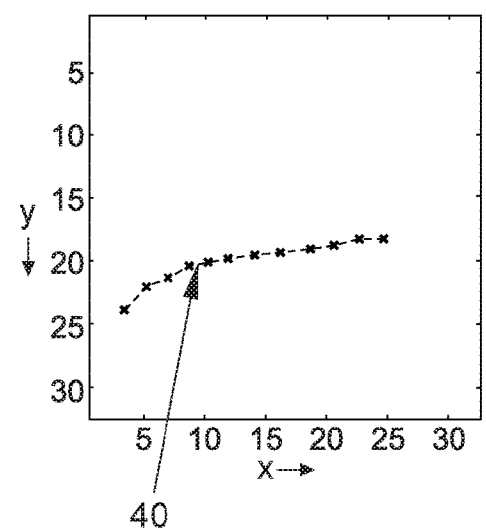

Referring to FIGS. 2A, 2B and 2C, an exemplary embodiment of the disclosed method is explained. The starting point in this case is the exemplary embodiment of the disclosed apparatus that is explained above with reference to FIG. 1.

In a first operation at 21, the capture unit 4 captures image data. In the exemplary embodiment, the image data comprise picture elements from frames, which are each associated with a time. A series of chronological frames is captured as video data, in particular. The frames further have associated distance information captured by the ToF camera 4.

The image data are transmitted to the control unit 2, where they are processed further. In a second operation at 22, the signal conditioning takes place in a manner known per se, with, for example, frames within the image data being able to be detected, for example, for the case of a video sequence. Further, besides the actual image data, it is also possible for metadata to be read in, for example, image information about a recording time associated with the frame, other time data or further information. Further, it is possible for filtering and/or calibration to be performed.

In a further operation at 23, the segmentation unit 5 of the apparatus performs a segmentation for the captured frames in a manner known per se. A schematic representation of an exemplary result is shown in FIG. 2B: a frame object 31, in the present case a hand 31, is detected as associated region, and an outline 32 of the hand 31 is determined. The frame object 31 is determined on the basis of coherent picture elements that have associated content. During the segmentation, regions, for example, from the reflection of further objects in the detection region, or picture elements that cannot be detected are identified and removed, wherein a multistage method can be used.

In the exemplary embodiment, there is provision for a gesture performed by a hand 31 to be detected. This is accomplished by virtue of the segmentation in operation at 23 being performed for each frame. First of all, the wrist adjoining the hand 31 and the arm are identified and removed from the image, since these regions are not supposed to be used for gesture detection. Further, there may be provision for an angle of inclination of the hand 31 to be determined and compensated for, with the positions of the filtered-out wrist relative to the rest of the hand being able to be used, for example. The subsequently determined outline 32 is defined as the profile of the outermost edge of the hand 31 or as a line through the centers of the picture elements arranged at the edge of the hand 31, for example.

In further exemplary embodiments, it is alternatively or additionally possible for a gesture performed using another input object 31 to be captured and detected. The segmentation operation at 23 is then performed in an accordingly adapted manner.

In further exemplary embodiments, the signal conditioning 22 and/or the segmentation 23 involve further methods for image processing that are known per se being used, for example, to detect a specific input object, in particular, of the hand 31, and to distinguish objects, for example, in the background of a frame, that are not supposed to be detected.

In a further operation at 24, extraction of features on the basis of the frame object 31 determined during the segmentation is performed. This is accomplished in the exemplary embodiment by virtue of a surface area circle 38 being determined, with the geometric centroid 33 of the surface of the detected frame object 31 first of all being determined as the center 33 of the surface area circle 38. To parameterize the surface area circle 38, a radius 34 is furthermore determined such that the surface area of the surface area circle 38 is equal to the surface area of the determined frame object 31.

The center 33 of the surface area circle 38 can be determined two-dimensionally on the basis of pixel positions associated with the individual picture elements of the frame. In the exemplary embodiment, there is furthermore provision for the picture elements of the frames' image data captured by the ToF camera 4 to comprise three-dimensional position information, in particular, the position of the pixels within a two-dimensional matrix and interval information for the individual pixels. The center 33 of the surface area circle 38 can then also be determined three-dimensionally. Data about an intensity of the reflected light for each pixel are furthermore included. This permits further weightings and other ways of determining the center 33 of the surface area circle 38.

In the exemplary embodiment, the position of the center 33 of the surface area circle 38 is transmitted to the trajectory calculation unit 10 and stored there, in particular, with the recording time of the associated frame. The method is applied to a series of chronologically successive frames. It is therefore possible for a multiplicity of earlier reference points 39 to be provided as positions at which the frame object 31 was detected each time. These earlier reference points 39 can each be assigned the recording time of the associated frame. That is to say that the position of the center 33 of the surface area circle 38 for the frame objects 31 detected in the frames can be tracked as a function of time. A trajectory 40 is ascertained that indicates the shape of the positions of the centers 33, 39. In this way, a movement of an input object depicted as a frame object 31 in the frames can be tracked, in particular. It is further possible for the trajectory 40 to be produced in another way.

In a further operation, the profile calculation unit 6 determines an interval profile, wherein the outline of the frame object is parameterized by polar coordinates with their origin at the center of the surface area circle. This can be accomplished, for example, by virtue of a pointer being defined that has its origin at the center of the surface area circle and extends up to the outline of the frame object. The interval profile indicates the length of this pointer on the basis of an angle that the pointer forms with a line pointing perpendicularly upward and running through the center. For example, the interval profile is produced such that the length of the pointer is plotted over a complete revolution clockwise from a position pointing perpendicularly upward. The angle of the pointer can be indicated in radians, for example, and normalized to 1 by the normalization factor $$\frac{1}{2\pi}.$$

Further, the interval profile can be normalized on the basis of the radius r of the surface area circle, that is to say by the normalization factor $$\frac{1}{r},$$

so that values of the interval profile vary by a normalized value of 1.

Optionally, the normalization factor can be stored for the frames and analyzed as a function of time. Analogously to the trajectory 40, for which the center 33 of the surface area circle 38 is considered as a function of time, the development of the normalization factor can be used to characterize the change in the detected frame object 31.

In further exemplary embodiments, the interval profile can be determined for points arranged equidistantly along the outline.

Optionally, the processing of the interval profile can be performed, for example, by smoothing, to reject noise.

Features of the interval profile are extracted, wherein calculations in the style of a curve discussion are performed. A first and a second derivative of the interval profile is determined. In the exemplary embodiment, there is provision for shape-based features to be extracted, in particular positions, intervals and/or amplitudes of extremes of the interval profile and also the positions of points of inflection.

By way of example, a gesture performed by an at least partly open hand facing the sensor of the capture unit 4 can result in a number of extended fingers being ascertained on the basis of the number of extracted maxima of the interval profile. This can involve further methods being used, for example, to avoid misdetections, by taking into consideration threshold values for a minimal or maximal amplitude of an extreme value or for a specific width of the curve shape in surroundings of the extreme.

In further exemplary embodiments, it is alternatively or additionally possible for further features to be extracted.

In the exemplary embodiment, there is provision for a continuity test to be performed, in which associated frame objects of successive frames are detected. This is effected to ensure that the trajectory 40 relates to the movement of the specific input object and does not change sharply. This can be accomplished by using different methods, in particular, a check is performed to determine whether sharp, implausible movements in the shape of the trajectory 40 can be observed. Further, it is possible to check whether sudden changes of size of the detected frame object 31 occur and indicate misdetections.

Since data of a series of frames are available, the trajectory can also be analyzed in the style of a curve discussion and used for gesture detection. Further, changes in the features extracted from the frames can be detected and taken into consideration. Trajectory features are extracted, for example, a direction or the placement and size of extremes for a distance, a speed and acceleration and the shape of the trajectory between the extremes.

In a further operation at 25, the exemplary embodiment involves distinguishing whether detection of a gesture is supposed to be performed or whether the system is supposed to be trained, for example, to learn a gesture afresh or to improve the detection of a known gesture.

If a gesture is supposed to be detected, a classification is performed by the association unit 7 in a operation at 26. This can be referred to as execution of the method in an "online mode", in which a gesture is supposed to be detected and an applicable output signal is supposed to be generated and output. In this case, the exemplary embodiment involves the previously determined interval profile, the trajectory and/or the extracted trajectory or profile features being used to determine an associated gesture. In this case, specific features may be associated with specific gestures, for example, a specific number of maxima of the interval profile or a direction of the trajectory. In that case, it is possible to distinguish whether one or more fingers are extended, and just the number of extended fingers can permit the association of a gesture.

Moreover, changes in the features determined for the frames of the image data over time can be taken into consideration. By way of example, the trajectory 40 can be evaluated and a direction of movement, speed and/or acceleration can be determined as a feature, for example. This can characterize a swipe or slide gesture, for example, that comprises a movement from one side to another side. Further, three-dimensional capture of the trajectory can result in a movement toward or away from the sensor being detected, in particular, in conjunction with slide or drag gestures.

Optionally, a change in the normalization factor, as explained above, can further be extracted as a feature and taken into consideration for the classification.

The classification can take place in multiple stages if need be, for example, by virtue of a classification first of all being performed on the basis of specific features and subsequently being refined on the basis of further features.

Moreover, the classification can take place on multiple levels, but firstly gestures detected in the frames (also considered as partial gestures in the present case) and secondly variable parameters of the gestures of the detected series of frames being taken into consideration.

A profile comparison can be performed, with reference profiles being used that are provided by the memory unit 9 in the exemplary embodiment. The profile comparison can take place in different ways.

By way of example, a preprocessing can be performed for the reference profiles and/or the reference trajectories, in particular, analogously to the extraction of features of the interval profile and the trajectory in operation at 24. The result of such a preprocessing for the reference profiles can be obtained even before the method is carried out, and the resulting profile features can be stored and provided. The profile comparison can then be performed comparatively easily, for example, by virtue of the number of extremes, their shape and placement, if need be in relation to one another, and/or the curve shape between the extremes, for example, on the basis of the parameters of the points of inflection, being taken into consideration. Moreover, the reference profiles can exhibit changes over time, for example, a movement in a particular direction and at a particular speed and/or acceleration. In this case too, the preprocessing can be effected such that suitable features can already be extracted in advance and provided for the profile comparison.

For the purpose of detecting the frame object and for the purpose of associating the gesture with the frame object, representations for specific gestures are examined and compared with the determined interval profile at the time of execution of a program for carrying out the method, for example, for a frame object detected in the frame. The representations are stored in a microcontroller, in particular, and in this way can be examined and evaluated particularly quickly at the time of execution. The representations can comprise features from a training run in which training for the detectable gestures is performed. If a gesture is detected during such examination, this result can be reported to a superordinate system, or an output signal can be generated and output.

In another disclosed embodiment, the profile comparison can be performed on the basis of a machine learning method, in particular, by a neural network. This typically requires a higher computation power, but can be used for detecting gestures on the basis of more complex interval profiles and/or trajectories, in particular. By way of example, the trajectory, the entire interval profile and possibly applicable data from reference profiles are used for the profile comparison in the present case. Not just individual extracted profile features are taken into consideration for the profile comparison in the present case.

In further exemplary embodiments, the trajectory and profile comparison can be effected in another way, the interval profile being assigned a reference profile or a group of reference profiles, or the trajectory being assigned a reference trajectory or a group of reference trajectories. The reference profiles and reference trajectories are each associated with a gesture.

After a gesture has been determined on the basis of the captured image data, a post-processing is performed in a further operation at 27, with an output signal being generated and output by the output unit 8. In the exemplary embodiment, there is provision for the output signal to comprise a control signal for the device 3, in this case the radio 3, and to be transmitted to the latter, with no output discernible by a human user being effected. The gesture control of the radio 3 is effected in a manner known per se, with, for example, a radio station being able to be selected when a gesture with a specific number of fingers is detected, or it is possible to change over to another station by swiping in one direction. In further exemplary embodiments, the output can be output in a manner perceptible to the user, for example, by a visually perceptible display.

In further exemplary embodiments, other devices 3 can be controlled by a gesture control, the gesture being used to capture an input.

If it is detected in decision operation at 25 that training of the gesture detection is supposed to be performed, a model training is performed in a operation at 28 and a model is generated in a further operation at 29. This can be stored in a nonvolatile state by the memory unit 9 and can be provided for later passes. The execution of the training can be performed as an "offline mode", that is to say without an output signal being generated. The model generated afresh in the process is altered in comparison with an earlier model, for example, to better detect a known gesture, or a new model can be produced, for example, for a gesture that is to be learned afresh. A model can comprise reference profiles, reference trajectories or comparable data, which can be used to detect a gesture on the basis of an interval profile and/or a trajectory. Optionally, it is subsequently possible for a classification for detecting a gesture and generation and output of an output signal to take place.

In a further exemplary embodiment, a classifier of a neural network can be trained or another machine learning method can be performed.

The methods in the online or offline mode that are explained above can be carried out individually or in succession, it being necessary to take into consideration that the detection reliability for a gesture can typically be improved by repeated training.

Referring to FIGS. 3A to 8B, exemplary embodiments of frame objects and associated interval profiles are explained, as can arise in frames of the image data in the disclosed method. The starting point in this case is the exemplary embodiment of the disclosed apparatus that is described above with reference to FIG. 1 and the exemplary embodiments of the disclosed method that is described above with reference to FIGS. 2A to 2C. The exemplary embodiments described relate to static gestures detected within frames. As explained above, the disclosed embodiments further involve a trajectory 40 being determined and being taken into consideration for detecting the gestures.

The image shown in each of the FIGS. 3A, 4A, 5A, 6A, 7A and 8A corresponds to a depiction, captured by the capture unit 4, of an input object after a segmentation operation in which a frame object 31 has been identified. For each picture element, an intensity reflected by the input object and/or an interval value can be captured, for example. The graphs in FIGS. 3B, 4B, 5B, 6B, 7B and 8B each show at least part of the respective interval profile 37 that has been obtained in a training run, that is to say in an offline mode of the disclosed method, in the example. The features captured on the basis of the frame objects 31 detected in the image data can be stored completely, for example, as image data, or in a compressed form, for example, by virtue of the profile features being extracted and stored.

Figure 3A:
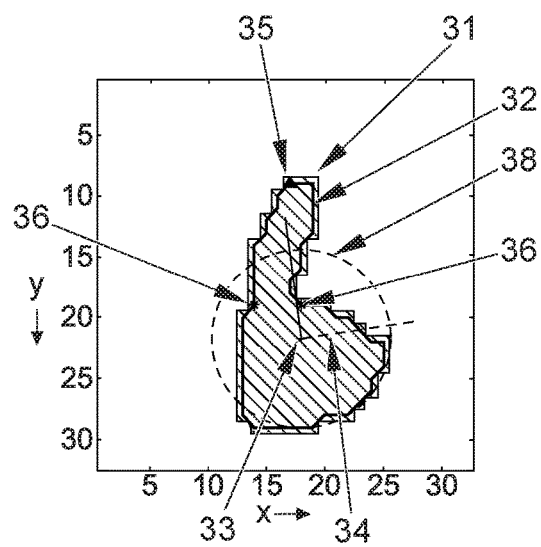
FIGS. 3A to 8B show exemplary embodiments of frame objects and associated interval profiles, as may arise in the disclosed method.

In the example shown in FIG. 3A, a frame object 31 has been detected within a frame of the image data, the frame object corresponding to a hand with an extended finger, for example. For the frame object 31, an outline 32 has been produced that corresponds to a solid line through the respective centers of the pixels of the frame object 31. Further, a surface area circle 38 has been determined, the center 33 of which coincides with the centroid of the frame object 31 and the radius 34 of which has been chosen such that the surface area of the surface area circle 38 is concordant with the surface area of the frame object 31.

The outline 32 of the frame object 31 is parameterized to produce an interval profile 37. This is accomplished by virtue of the interval from the center 33 of the surface area circle 38 being determined for points along the outline 32 and being normalized on the basis of the radius 34 of the surface area circle 38. That is to say that the points of intersection between the outline 32 and the surface area circle 38 each have an interval of 1. The interval profile 37 indicates the normalized interval of the points on the outline 32 on the basis of their position on the outline 32, the position being calculated as an interval along the outline 32, beginning at any point on the outline 32.

In further exemplary embodiments, the interval profile 37 can indicate the normalized interval on the basis of an angle that the connecting line between the center 33 and the point on the outline 32 forms with a perpendicular line, for example.

Figure 3B:
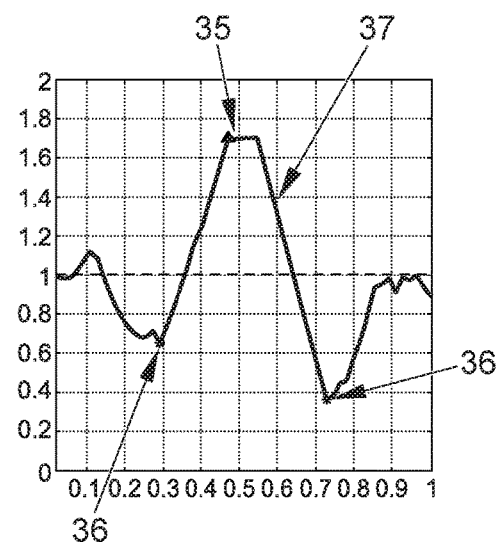

The interval profile 37 of the frame object 31 shown in FIG. 3A is shown in FIG. 3B. A portion of the interval along the outline 32, normalized to values between 0 and 2, is shown along the x axis. The portion requiring consideration can be determined in the manner known per se. The portion comprises the extremes shown in FIG. 3A, namely 2 minima 36 (shown as asterisks) and a maximum 35 (shown as a triangle). The extremes 35, 36 are determined in a manner known per se, in particular, by the first and second derivatives of the interval profile 37 and possibly a smoothing. Further, it is possible for threshold values to be taken into consideration, for example, by virtue of maximum 35 being detected only when there is a rise above a lower threshold value and a minimum 36 being detected only when there is a drop below an upper threshold value.

In the example shown in FIGS. 3A and 3B, the interval profile 37 can be used to identify a maximum 35 corresponding to an extended finger, for example. That is to say that such a gesture can already be detected on the basis of the interval profile 37.

In further exemplary embodiments, there is provision for the interval profile 37 to be compared with one or more reference profiles. This profile comparison can involve the curve shapes being compared, and/or profile features can be extracted and compared, for example, to check whether the measured interval profile 37 has the same number of maxima 35 as a reference profile. In further exemplary embodiments, a neural network or another method can be used to perform the profile comparison.

The data captured in an offline mode in this example can be used to generate a model, for example, to learn a new gesture, by virtue of the extracted features 35, 36 being deposited in a manner stored in a model and being retrievable later as a reference profile. Further, it is possible for a model, that is to say one or more reference profiles associated with the gesture detected in the present case, to be updated and stored.

Figure 4A:
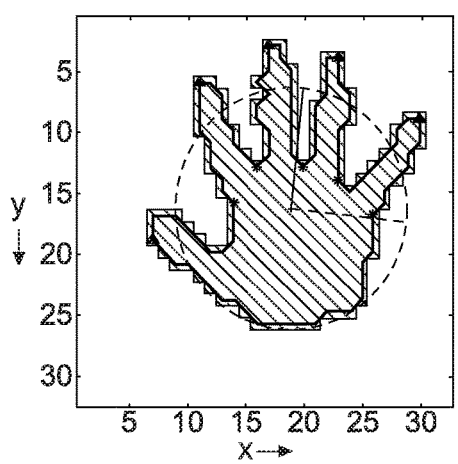
Figure 4B:
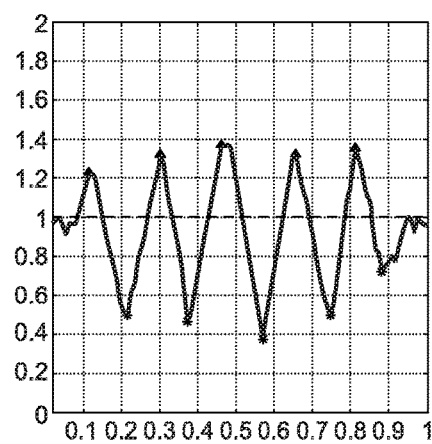

In the example shown in FIGS. 4A and 4B, image data for an open hand having five fingers have been captured. In the manner described above, an interval profile 37 has been determined that is shown in FIG. 4B. The interval profile 37 can be used to identify five maxima 35 (shown as triangles), which corresponds to the number of extended fingers in the example.

Figure 5A:
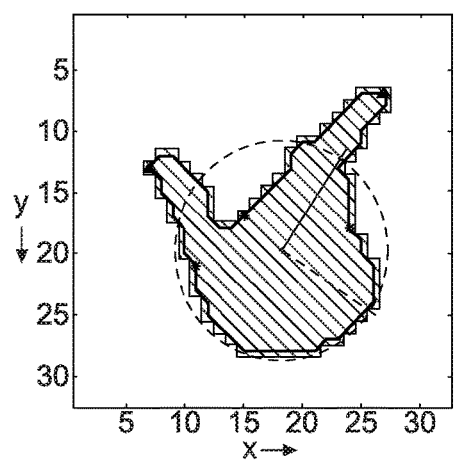
Figure 5B:
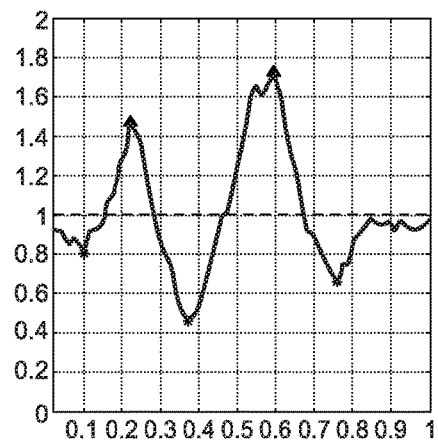

In the example shown in FIGS. 5A and 5B, image data for a hand having two extended fingers, for example, thumb and index finger, have been captured. In the manner described above, an interval profile has been determined that is shown in FIG. 5B and in which two maxima 35 (shown as triangles) are identified. In the example, this corresponds to the number of extended fingers. Further, the curve shape can be analyzed and, for example, the interval between the maxima 35 associated with the extended fingers can be evaluated. The detected gesture can be interpreted as a zoom gesture, for example, in particular, if a change in the interval over the captured image sequence is detected.

Figure 6A:
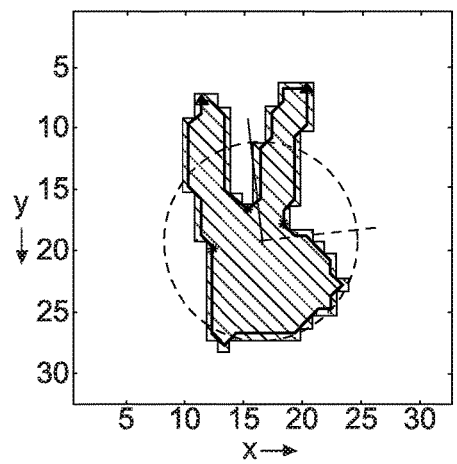
Figure 6B:
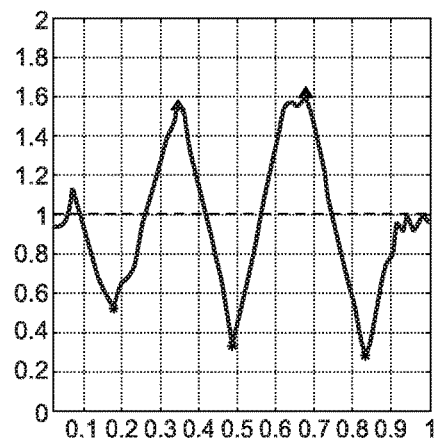

In the example shown in FIGS. 6A and 6B, image data for a hand having two extended fingers, for example, index finger and middle finger, have been captured—in a similar manner to in the example shown in FIGS. 5A and 5B. In the manner described above, an interval profile has been determined that is shown in FIG. 6B and in which two maxima 35 (shown as triangles) are identified. In the example, this corresponds to the number of extended fingers. To distinguish this gesture from the gesture shown above with reference to FIGS. 5A and 5B, it is possible for the first and second derivatives of the interval profiles to be taken into consideration, for example. That is to say that the shape at the rise and the amplitude level are included in a model association with the respective gesture. By way of example, in the case shown, it is possible to establish how far the two maxima 35 are from one another and/or how steeply the interval profile 37 runs between the maxima 35.

In further exemplary embodiments, a neural network or a comparable method can be used to detect a gesture on the basis of the interval profile 37. Such detection is typically much more complex than the described detection by individual profile parameters, which can easily be determined using curve discussion means.

In the examples mentioned above, hands have been considered as input objects. In further exemplary embodiments, other items and input objects, for example, a foot, head or an everyday item, can also be used to capture gestures. This can be accomplished by virtue of models, in particular, with reference profiles, being produced and stored. If the same number of extremes 35, 36 and points of inflection in the respective interval profiles arise for different gestures, the derivatives of the interval profiles 37 and their respective features can be used to detect a gesture. In the disclosed method, this involves very small memory sizes being used in comparison with other techniques, for example, below 50 bytes per frame object, and particularly fast processing can be ensured, for example, by a microcontroller with low computation power below 1 Mips (million instructions per second).

The interval profiles 37 can alternatively or additionally be used to extract various other profile features, for example, an eccentricity, a roundness, a swing of an amplitude, an inclination in space and/or repetitions of the curve, for example, the detection of a periodicity.

The described exemplary embodiments of the disclosed method further involve the normalization on the basis of the radius 34 of the surface area circle 38 being used to ensure that gestures with an input object of different size, for example, different hands, can be detected.

Figure 7A:
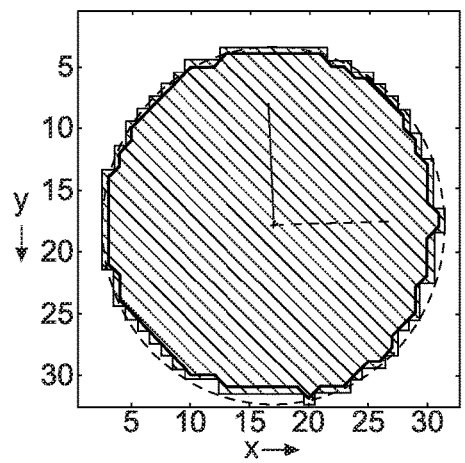
Figure 7B:
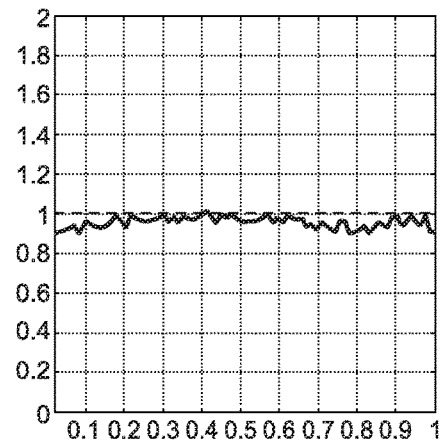

In the example shown in FIGS. 7A and 7B, image data for a round surface area, for example, of a sphere or of a circular sign, have been captured. In the manner described above, an interval profile 37 has been determined that is shown in FIG. 7B and exhibits a shape that is substantially parallel to the outline 32 of the surface area circle 38. No extremes 35, 36 of the curve are detected. Such a line can thus be used to identify a circular input object.

Figure 8A:
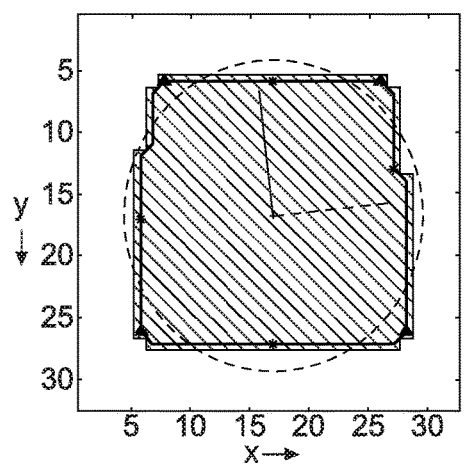
Figure 8B:
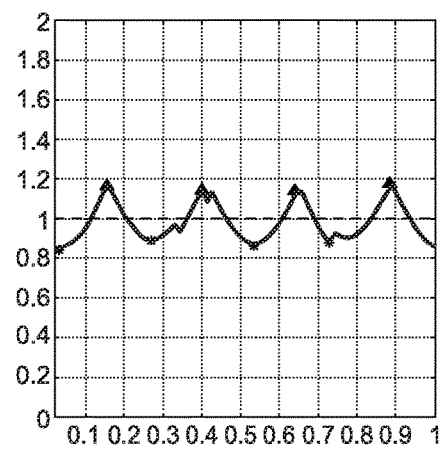

In the example shown in FIGS. 8A and 8B, image data for a rectangular parallelepiped have been captured. In the manner described above, an interval profile 37 has been determined that is shown in FIG. 8B and has four maxima 35 at regular intervals, between which maxima there are four minima 36 arranged, likewise at regular intervals. Further, for example, the captured derivative and possibly the second derivative can be used to determine that the shape of the interval profile is repeated substantially periodically between the maxima 35. Such a line can thus be associated with a square input object.

Features as in the cases explained above with reference to FIGS. 7A to 8B can be used, for example, to distinguish between different input objects, for example, a hand, a foot and a head.

In further exemplary embodiments, image data are further captured by a camera such that other image processing methods, for example, neural networks, can be used to detect different input objects, image processing methods that are known per se being used. This allows, for example, a specific input object, for example, a hand, to be captured and located to facilitate the segmentation of the image data and/or to define a capture space in which the input object has been located. The detection of a gesture by the disclosed method can then be limited to a specific range of the image data and performed more quickly.

In further embodiments, it is possible for features formed by outlines other than the outermost outline 32 of the frame object 31 detected during the segmentation to be taken into consideration. By way of example, the frame object 31 detected during the segmentation can have a "hole", that is to say a region surrounded by the surface area of the frame object 31 that is itself not part of the frame object 31. Such a region can be formed, for example, in the event of a hand gesture such as the "OK" signal widely used among divers. An enclosed region of this kind can be used as a further feature for detecting a gesture. Further, there may be provision for parameterization of the enclosed region to take place and for parameters thus obtained in the process likewise to be taken into consideration for detecting the gesture.

Alternatively or additionally, the duration of the capture of a gesture can be captured. In these cases, the image data are processed essentially as described above, the image data of the respective frames being able to be analyzed separately. Alternatively or additionally, gestures may be characterized by a sequence of changes in the measured interval profiles 37, for example, a zoom gesture, in the case of which the interval between two extended fingers is changed, this being able to be detected on the basis of changing intervals between the maxima 35 in the interval profiles 37. Further, it is possible to take into consideration if a specific gesture is captured for a specific period of time. Further gestures may alternatively or additionally be provided for and detected in a manner known per se.

LIST OF REFERENCE SIGNS

1 Transportation vehicle
2 Control unit
3 Device; radio
4 Capture unit; time-of-flight (ToF) camera
5 Segmentation unit
6 Profile calculation unit
7 Association unit
8 Output unit
9 Memory unit
10 Trajectory calculation unit
20 Outline
21 Capture of image data
22 Signal conditioning
23 Segmentation
24 Extraction of features
25 Decision between training or detecting
26 Classification
27 Post-processing
28 Model training
29 Generation of a model
31 Frame object; hand
32 Outline
33 Reference point; center; geometric centroid
34 Radius
35 Profile feature; extreme value; maximum
36 Profile feature; extreme value; minimum
37 Interval profile
38 Surface area circle
39 Earlier reference points
40 Trajectory

The invention claimed is:

1. A method for capturing a user input based on a gesture, the method comprising:
   capturing image data having at least two frames, wherein the frames have associated recording times;
   performing a segmentation of each of the captured frames, determining a respective frame object for each frame, and determining a reference point for the frame object;
   determining a trajectory based on a relative change of positions of the reference points of the frames;
   determining a respective interval from the reference point of the frame object to each of a multiplicity of points on an outline of the frame object;
   generating a measured interval profile for each frame object based on the intervals, wherein the measured interval profile of the frame object comprises a parameterization of the outline of the frame object in polar coordinates starting from the reference point of the frame object, wherein the measured interval profile is generated by plotting a length of a pointer from the reference point to the outline of the frame object over a complete revolution clockwise starting from a perpendicularly upward location, and wherein the points on the outline are arranged equidistantly along the outline;

determining a first derivative and a second derivative with respect to location of the interval profiles and comparing the interval profiles based on the determined first and second derivative;

determining geometric profile features of the interval profiles based on the determined first and second derivative, wherein the geometric profile features of the interval profile include a number and placement of extreme values and points of inflection of the interval profile;

determining a gesture based on the trajectory and the determined geometric profile features; and generating and outputting an output signal based on the determined gesture.

2. The method of claim 1, wherein the reference point is the geometric centroid of the frame object.

3. The method of claim 1, wherein a continuity test detects associated frame objects of successive frames, and the trajectory is determined based on the associated frame objects.

4. The method of claim 1, wherein orientations are determined for the frame objects, and the gesture is further determined based on the orientations of the frame objects.

5. The method of claim 1, wherein the captured image data comprise picture elements and the picture elements have associated distance information.

6. The method of claim 1, wherein a respective outline of the frame object is determined for each frame, and wherein the gesture is further determined based on the measured interval profile.

7. The method of claim 6, wherein geometric profile features of the measured interval profiles are determined, and the gesture is determined based on the geometric profile features.

8. The method of claim 6, wherein the gesture is determined based on a profile comparison in which the measured interval profiles are compared with a multiplicity of reference interval profiles, and wherein the reference interval profiles each have an associated gesture.

9. The method of claim 8, wherein geometric reference features are determined for the reference interval profiles, and the profile comparison is performed based on the reference features and the profile features of the measured interval profiles.

10. The method of claim 8, wherein at least two extreme values of the measured interval profiles are determined, and the profile comparison is effected based on the determined extreme values of the measured interval profiles.

11. The method of claim 8, wherein the profile comparison is performed based on a machine learning method.

12. The method of claim 1, wherein the determination of the gesture involves testing whether at least one frame object of the frames is detected as a hand.

13. The method of claim 1, wherein the gesture comprises a rotation of a hand.

14. An apparatus for capturing a user input based on a gesture, the apparatus comprising:

a capture unit configured to capture image data having at least two frames, wherein the frames have associated recording times;

a segmentation unit configured to perform a segmentation of each of the captured frames, determine a respective frame object for each frame, and determine a reference point for the frame object;

a trajectory calculation unit configured to determine a trajectory based on a relative change of positions of the reference points of the frames;

a profile calculation unit configured to determine a respective interval from the reference point of the frame object to each of a multiplicity of points on an outline of the frame object, generate a measured interval profile for each frame object based on the intervals, wherein the measured interval profile of the frame object comprises a parameterization of the outline of the frame object in polar coordinates starting from the reference point of the frame object, wherein the measured interval profile is generated by plotting a length of a pointer from the reference point to the outline of the frame object over a complete revolution clockwise starting from a perpendicularly upward location, and wherein the points on the outline are arranged equidistantly along the outline, determine a first derivative and a second derivative with respect to location of the interval profiles and compare the interval profiles based on the determined first and second derivative, and determine geometric profile features of the interval profile based on the determined first and second derivative, wherein the geometric features of the interval profile include a number and placement of extreme values and points of inflection of the interval profile, an association unit configured to determine a gesture based on the trajectory and the determined geometric profile features; and an output unit configured to generate and output an output signal based on the determined gesture.

15. The apparatus of claim 14, wherein the reference point is the geometric centroid of the frame object.

16. The apparatus of claim 14, wherein a continuity test detects associated frame objects of successive frames, and the trajectory is determined based on the associated frame objects.

17. The apparatus of claim 14, wherein orientations are determined for the frame objects, and the gesture is further determined based on the orientations of the frame objects.

18. The apparatus of claim 14, wherein the captured image data comprise picture elements and the picture elements have associated distance information.

19. The apparatus of claim 14, wherein a respective outline of the frame object is determined for each frame, and wherein the gesture is further determined based on the measured interval profile.

20. The apparatus of claim 19, wherein geometric profile features of the measured interval profiles are determined and the gesture is determined based on the geometric profile features.

21. The apparatus of claim 19, wherein the gesture is determined based on a profile comparison in which the measured interval profiles are compared with a multiplicity of reference interval profiles, and wherein the reference interval profiles each have an associated gesture.

22. The apparatus of claim 21, wherein geometric reference features are determined for the reference interval profiles, and the profile comparison is performed based on the reference features and the profile features of the measured interval profiles.

23. The apparatus of claim 21, wherein at least two extreme values of the measured interval profiles are determined, and the profile comparison is effected based on the determined extreme values of the measured interval profiles.

24. The apparatus of claim 21, wherein the profile comparison is performed based on a machine learning method.

25. The apparatus of claim 14, wherein the determination of the gesture involves testing whether at least one frame object of the frames is detected as a hand.

26. The apparatus of claim 14, wherein the gesture comprises a rotation of a hand.

* * * * *